(12) United States Patent
Sah et al.

(10) Patent No.: US 8,224,544 B2
(45) Date of Patent: Jul. 17, 2012

(54) METHOD AND APPARATUS TO CONTROL LAUNCH OF A VEHICLE HAVING AN ELECTRO-MECHANICAL TRANSMISSION

(75) Inventors: Jy-Jen F. Sah, West Bloomfield, MI (US); Anthony H. Heap, Ann Arbor, MI (US); Gregory A. Hubbard, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 851 days.

(21) Appl. No.: 11/936,083

(22) Filed: Nov. 7, 2007

(65) Prior Publication Data

US 2009/0118917 A1 May 7, 2009

(51) Int. Cl.
*G06F 7/00* (2006.01)
*G06F 17/00* (2006.01)
*G06F 19/00* (2011.01)

(52) U.S. Cl. ........... 701/68; 701/51; 701/53; 701/54; 701/67; 701/69; 180/65.21; 180/65.265; 180/65.275; 180/65.28; 180/655.285; 903/918

(58) Field of Classification Search .... 180/65.21–65.29; 903/918; 701/22, 51–69, 99
See application file for complete search history.

(56) References Cited

U.S. PATENT DOCUMENTS

| | | | | |
|---|---|---|---|---|
| 6,146,302 A * | 11/2000 | Kashiwase | ........................ | 475/5 |
| 6,278,915 B1 * | 8/2001 | Deguchi et al. | ................. | 701/22 |
| 6,278,916 B1 * | 8/2001 | Crombez | ....................... | 701/22 |
| 6,362,585 B1 * | 3/2002 | Hiti et al. | ...................... | 318/430 |
| 6,527,658 B2 * | 3/2003 | Holmes et al. | ..................... | 475/5 |
| 6,553,301 B1 * | 4/2003 | Chhaya et al. | ................... | 701/54 |
| 6,817,964 B2 * | 11/2004 | Kayukawa et al. | ............... | 477/15 |
| 6,832,148 B1 | 12/2004 | Bennett | | |
| 6,868,318 B1 | 3/2005 | Cawthorne | | |
| 6,988,605 B2 * | 1/2006 | Senger et al. | ............... | 192/103 F |
| 7,154,236 B1 | 12/2006 | Heap | | |
| 7,572,201 B2 * | 8/2009 | Supina et al. | .................... | 475/5 |
| 2005/0076958 A1 | 4/2005 | Foster | | |
| 2005/0077867 A1 | 4/2005 | Cawthorne | | |
| 2005/0077877 A1 | 4/2005 | Cawthorne | | |
| 2005/0080523 A1 | 4/2005 | Bennett | | |
| 2005/0080527 A1 | 4/2005 | Tao | | |
| 2005/0080535 A1 | 4/2005 | Steinmetz | | |
| 2005/0080537 A1 | 4/2005 | Cawthorne | | |
| 2005/0080538 A1 | 4/2005 | Hubbard | | |
| 2005/0080539 A1 | 4/2005 | Hubbard | | |
| 2005/0080540 A1 | 4/2005 | Steinmetz | | |
| 2005/0080541 A1 | 4/2005 | Sah | | |
| 2005/0103544 A1 * | 5/2005 | Takami et al. | ............... | 180/65.2 |
| 2005/0182526 A1 | 8/2005 | Hubbard | | |
| 2005/0182543 A1 | 8/2005 | Sah | | |
| 2005/0182546 A1 | 8/2005 | Hsieh | | |
| 2005/0182547 A1 | 8/2005 | Sah | | |
| 2005/0189918 A1 | 9/2005 | Weisgerber | | |

(Continued)

*Primary Examiner* — Hussein Elchanti
*Assistant Examiner* — Rami Khatib

(57) ABSTRACT

A method and apparatus to control an electro-mechanical transmission is provided, selectively operative in a plurality of fixed gear modes and continuously variable modes, and comprising first and second electrical machines and hydraulically-actuated clutches. Included is launching a vehicle so equipped, comprising operating the electro-mechanical transmission in a continuously variable mode to transmit motive torque from the first electrical machine to the driveline, and, selectively increasing an operating speed of the engine and selectively actuating a second clutch to transmit motive torque generated by the second electrical machine when an operator torque request exceeds a predetermined threshold.

9 Claims, 4 Drawing Sheets

U.S. PATENT DOCUMENTS

| | | |
|---|---|---|
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0228369 A1* | 9/2008 | Stroh et al. ............ 701/84 |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0144002 A1 | 6/2009 | Zettel |

* cited by examiner

METHOD AND APPARATUS TO CONTROL LAUNCH OF A VEHICLE HAVING AN ELECTRO-MECHANICAL TRANSMISSION

TECHNICAL FIELD

This disclosure pertains generally to vehicles having electro-mechanical transmissions, and more specifically to control thereof.

BACKGROUND

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection.

Engineers implementing vehicles with powertrain systems having electro-mechanical transmissions with hydraulically-actuated clutches are tasked with implementing transmission control schemes to effectively launch the vehicle responsive to operator torque requests.

SUMMARY

A method, preferably executed as a computer program encoded in an article manufacture for a control system for an electro-mechanical transmission is provided. The encoded computer program effects a launch of a vehicle including a powertrain comprising an engine and first and second electrical machines operative to selectively transmit motive torque to the electro-mechanical transmission, which is selectively operative in a plurality of fixed gear modes and two continuously variable modes. The method comprises operating the electro-mechanical transmission in a continuously variable mode to transmit motive torque from the first electrical machine to the driveline, and, selectively increasing an operating speed of the engine and selectively actuating a second clutch to transmit motive torque generated by the second electrical machine when an operator torque request exceeds a predetermined threshold.

BRIEF DESCRIPTION OF THE DRAWINGS

One or more embodiments will now be described, by way of example, with reference to the accompanying drawings, in which.

DETAILED DESCRIPTION OF THE PREFERRED EMBODIMENT

Figure 1:
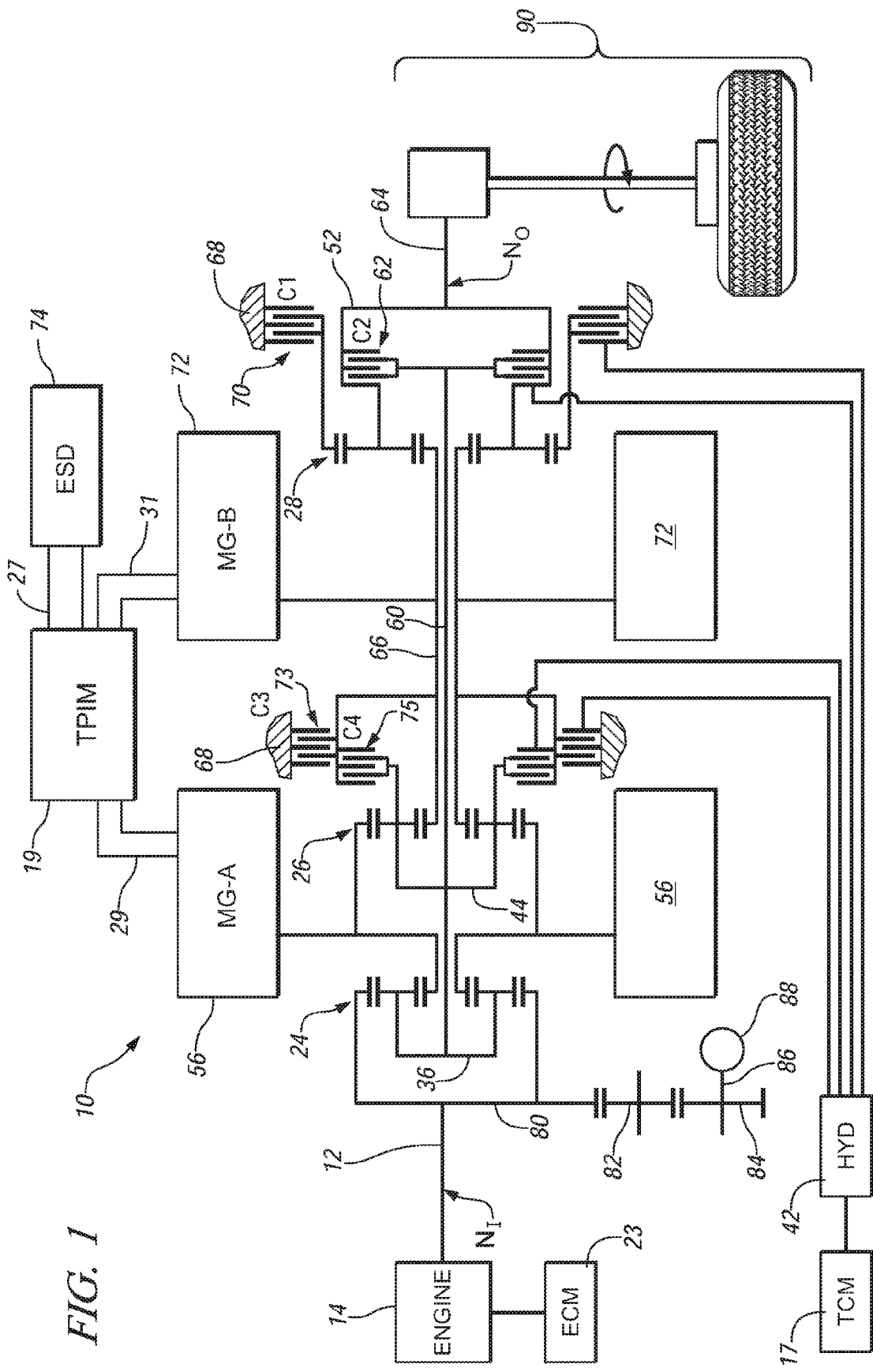
FIG. 1 is a schematic diagram of an exemplary powertrain, in accordance with the present disclosure.
Figure 2:
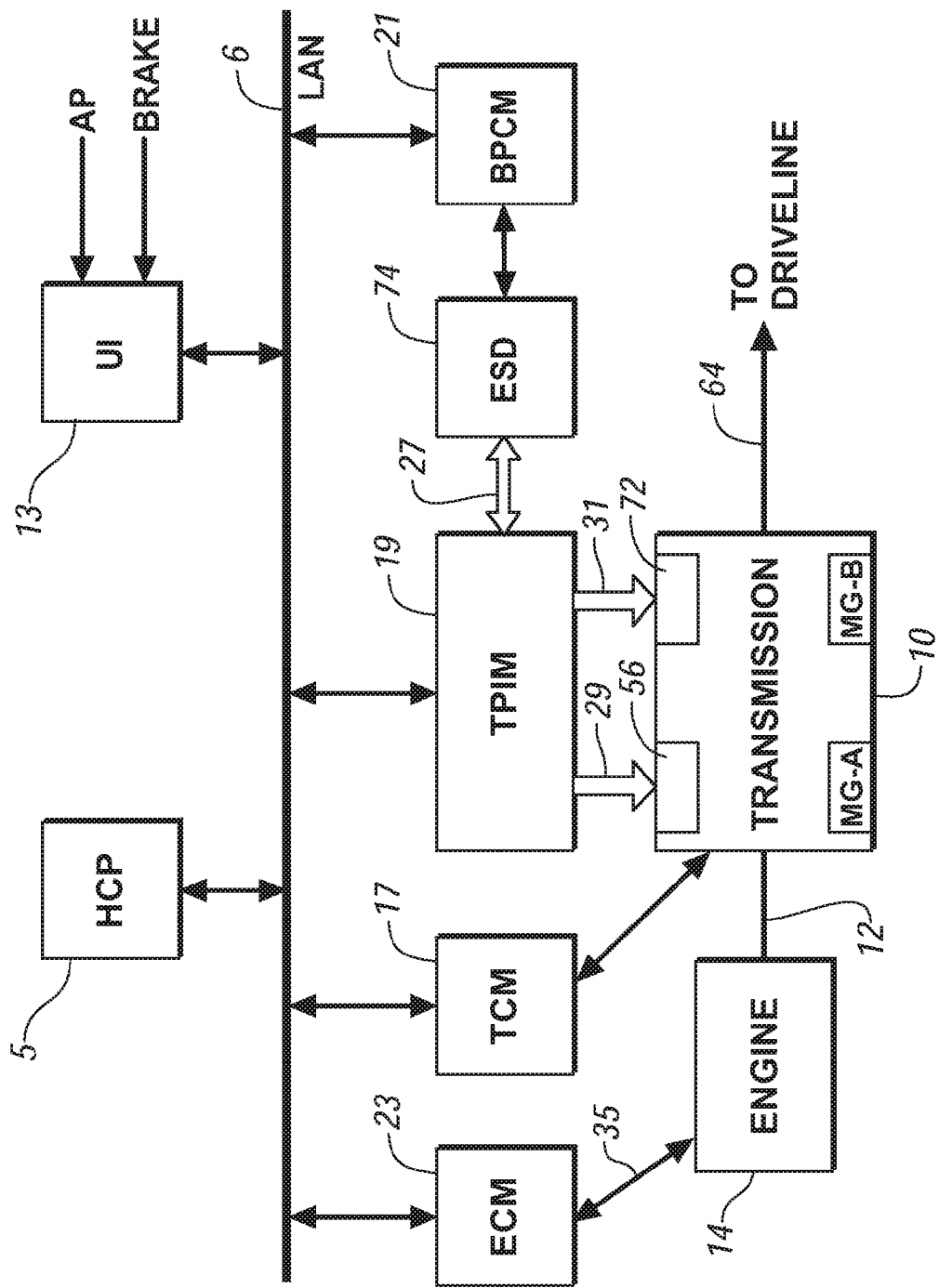
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict a system comprising an engine 14, transmission 10, control system, and driveline 90.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission is depicted in FIG. 1, and is designated generally by the numeral 10. The transmission 10 has an input shaft 12 that is preferably directly driven by an internal combustion engine 14. Engine input through input shaft 12 is characterized in terms of input torque, $T_I$, and input speed, $N_I$. The transmission 10 utilizes three planetary-gear sets 24, 26 and 28, and four torque-transmitting devices, i.e. clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated brake clutch devices selectively groundable to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A and MG-B 56 and 72 are preferably coaxially oriented about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque to one or more drive wheels. Transmission output through output member 64 is characterized in terms of output torque, $T_O$, and output speed, $N_O$.

Each clutch is preferably hydraulically actuated, receiving pressurized hydraulic fluid from a pump, described below, via an electro-hydraulic control circuit 42 described hereinbelow with reference to FIG. 3.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module ('TPIM') 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e. MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output, $T_O$. Exemplary vehicle operator inputs to the UI 13 include an accelerator pedal ('AP'), a brake pedal ('Brake'), transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request, $T_{O\_REQ}$, an engine torque command, clutch torque commands for the various clutches C1, C2, C3, C4 of the transmission 10; and motor torque commands for MG-A and MG-B. The TCM is operatively connected to the electro-hydraulic control circuit 42 of FIG. 3, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual engine torque input to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_I$, to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine the operator torque request, $T_{O\_REQ}$, to be delivered to shaft 64 at output torque, $T_O$. Selectively operated components of the transmission 10 are appropriately controlled and manipulated to respond to the operator torque request. Final vehicle acceleration is affected by other factors, including, e.g., road load, road grade, and vehicle mass. The HCP 5 monitors the parametric states of the torque-generative devices, and determines the output of the transmission required to arrive at the desired torque output, as described with reference to FIG. 4.

The exemplary two-mode, compound-split, electro-mechanical transmission operates in several fixed gear operating modes and continuously variable operating modes, described with reference to FIG. 1, and Table 1, below.

TABLE 1

| Transmission Operating Mode | Actuated Clutches | |
| --- | --- | --- |
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in Table 1 indicate which of the specific clutches C1, C2, C3, and C4 are actuated for each operating mode. Additionally, in various transmission operating modes, MG-A and MG-B may each operate as an electrical motor to generate motive torque, or as a generator to generate electrical energy. Mode I is engaged when clutch C1 70 is actuated in order to "ground" the outer gear member of the third planetary gear set 28. Mode II is engaged when clutch C1 70 is released and clutch C2 62 is actuated to connect the shaft 60 to the carrier of the third planetary gear set 28. Other factors outside the scope of the disclosure affect when the electrical machines 56, 72 operate as motors and generators, and are not discussed herein. The control system, shown primarily in FIG. 2, is operable to provide a range of transmission output speeds at shaft 64 from relatively slow to relatively fast within each transmission operating mode. Modes I and II refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as shown in Table 1, above.

When the additional clutch is fully actuated, fixed gear ratio operation of input-to-output speed of the transmission, i.e. $N_I/N_O$, is achieved. The rotations of machines MG-A and MG-B 56, 72 are dependent on internal rotation of the mechanism as defined by the clutching and proportional to the input speed, $N_I$. The machines MG-A and MG-B function as motors or generators.

Figure 3:
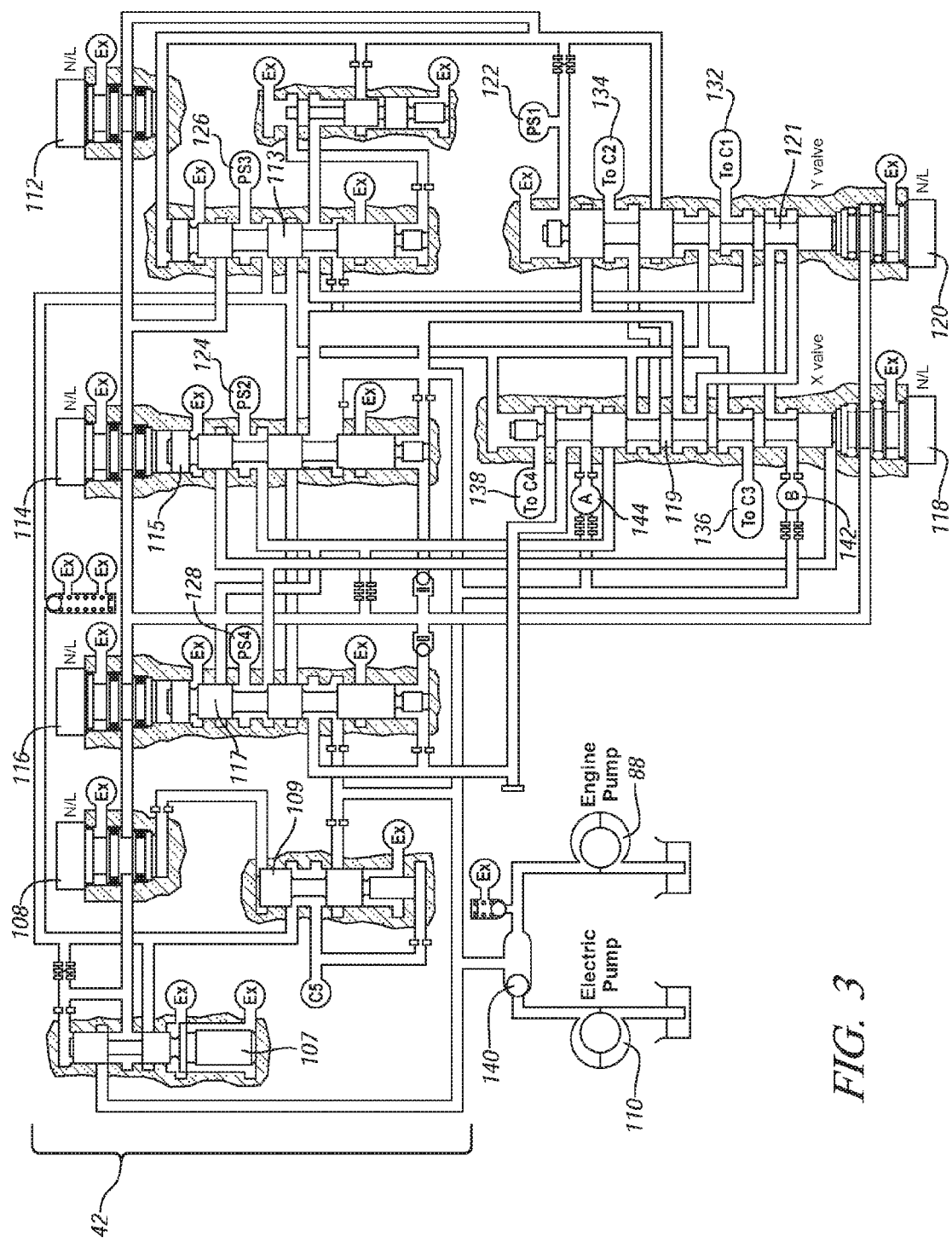
FIG. 3 is a schematic diagram of a hydraulic circuit, in accordance with the present disclosure; and, FIG. 4 is a graphical depiction, in accordance with the present disclosure.

Referring to FIG. 3, a schematic diagram is depicted which provides a more detailed description of the exemplary electro-hydraulic system for controlling flow of hydraulic fluid in the exemplary transmission. The main hydraulic pump 88, driven off the input shaft from the engine 10, and auxiliary pump 110, operatively electrically controlled by the TPIM 19, provide pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, active cooling circuits for machines A and B, and a base cooling circuit for cooling and lubricating the transmission 10 via passages 142, 144 (not depicted in detail). As previously stated, the TCM 17 is preferably operable to actuate the various clutches to achieve various transmission operating modes through selective actuation of hydraulic circuit flow control devices comprising pressure control solenoids ('PCS') PCS1 108, PCS2 112, PCS3 114, PCS4 116 and solenoid-controlled flow management valves X-valve 118 and Y-valve 120. The circuit is fluidly connected to pressure switches PS1, PS2, PS3, and PS4 via passages 124, 122, 126, and 128, respectively. The pressure control solenoid PCS1 108 has a control position of normally high and is operative to provide modulation of fluidic pressure in the hydraulic circuit through fluidic interaction with pressure regulator 109. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states reference positions of each valve effecting flow control to different devices in the hydraulic circuit 42 and the transmission 10. The X-valve 119 is operative to direct pressurized fluid to clutches C3 and C4 and cooling systems for stators of MG-A and MG-B via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. Selective control of the X- and Y-valves and actuation of the solenoids PCS2, PCS3, and PCS4 facilitate flow of hydraulic fluid to actuate clutches C1, C2, C3, and C4, and provide cooling for the stators of MG-A and MG-B.

A logic table that illustrates control of the exemplary electro-hydraulic control circuit 42 is provided with reference to Table 2, below.

TABLE 2

| Operating State | X-Valve Logic | Y-Valve Logic | PCS1 | PCS2 | PCS3 | PCS4 |
|---|---|---|---|---|---|---|
| Mode I | No Latch 0 | C2 Latch 0 | Normal-High LM | Normal-High MG-B Stator Cool | Normal-High C1 | Normal-Low MG-A Stator Cool |
| Mode II | 0 | 1 | LM | C2 | MG-B Stator Cool | MG-A Stator Cool |
| Low Range | 1 | 0 | LM | C2 | C1 | C4 |
| High Range | 1 | 1 | LM | C2 | C3 | C4 |

Selective control of the X- and Y-valves and actuation of the solenoids PCS2, PCS3, and PCS4 facilitate flow of hydraulic fluid to actuate clutches C1, C2, C3, and C4, and provide cooling for the stators of MG-A and MG-B. Solenoid PCS1 modulates line pressure ('LM' for line modulation). Low range refers to fixed gear operation in GR1, GR2, and GR3. High range refers to fixed gear operation in GR3 and GR4.

Figure 4:
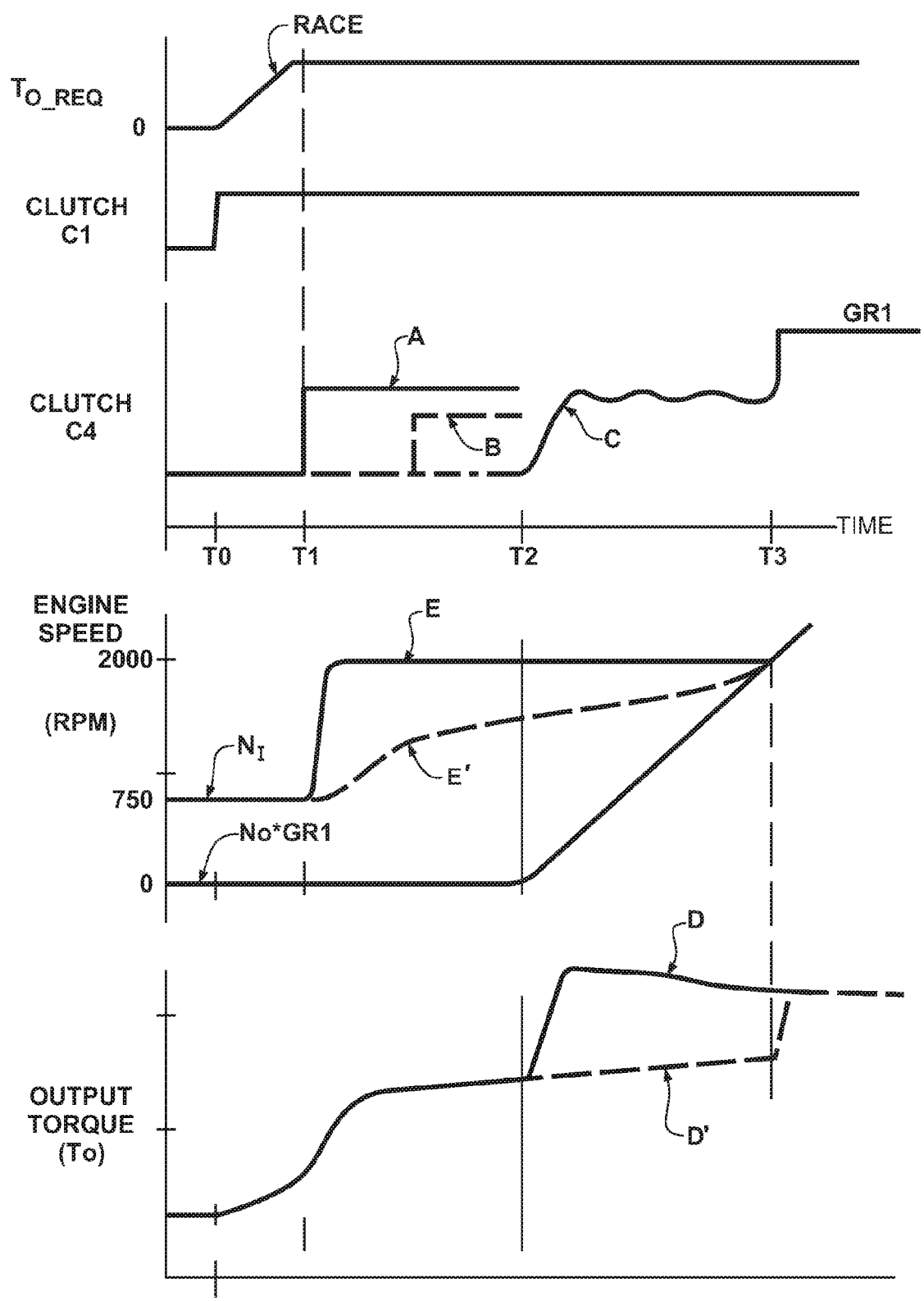

Referring now to FIG. 4, a method for launching a vehicle from a zero- or low-vehicle-speed operation is described, with reference to the system detailed in FIGS. 1, 2, and 3, and Tables 1 and 2. The system detailed herein is meant to be illustrative and not restrictive. Vehicle launch is effected by the control system in response to the operator torque request $T_{O\_REQ}$, i.e., when the operator requests acceleration, by depressing the accelerator pedal, AP, and releasing the brake pedal, BRAKE. At time T0, the vehicle is operational, and there is an initial operator torque request, $T_{O\_REQ}$, to launch the vehicle. Launch is accomplished by operation in continuously variable Mode I, with clutch C1 actuated and motive torque generated by MG-B 72. Electrical machine MG-A 56, driven by the engine 14, operates as an electrical generator to supply electrical energy to the ESD 74 and MG-B. The engine, when operating, is operating at or near an engine speed of about 750 revolutions per minute ('RPM'), the engine speed sufficient to drive the hydraulic pump 88 to provide clutch actuation pressure to clutch C1 and to provide input to MG-A for electrical energy generation. Transmission output torque, $T_O$, is primarily constrained by torque limits of electrical motors MG-A and MG-B, battery power, and engine input torque, $T_I$.

Under normal launch operating conditions, i.e. an unassisted launch, the vehicle operates in Mode I, with clutch C1 engaged, and increasing engine speed and increasing output torque, $T_O$, shown with reference to Lines E' and D'. The engine speed depicted as Line E' comprises an engine input speed that is optimized based upon torque and power demands through the powertrain system. After some elapsed time, e.g., at a point T3, engine input speed, $N_I$, is synchronized with speed of the output shaft 64 multiplied by the gear ratio of GR1, i.e. $N_O*GR1$, and clutch C4 is engaged to effect operation in the first fixed gear, GR1.

Under specific conditions, the operator torque request, $T_{O\_REQ}$, exceeds predetermined thresholds and reaches a "RACE" condition, leading to an assisted launch. The RACE torque request comprises, e.g., the accelerator pedal depressed beyond a threshold, the accelerator pedal depressed to a substantially wide open throttle ('WOT') condition, and simultaneous depression of both the accelerator pedal, AP, and the brake pedal, BRAKE, at a vehicle speed of zero or substantially close to zero, i.e., a power braking mode of operation. The RACE torque request is shown occurring at time T1. In response to the RACE torque request, the control system substantially immediately increases the engine speed, $N_I$, through control actions of the ECM 23. The engine speed is shown as Line E, increasing from an idle speed of about 750 RPM to about 2000 RPM in this example, providing increased power input to MG-A to generate electrical energy transmitted to MG-B to facilitate increased torque output therefrom. At the same time, the TCM executes a "Fill Command", depicted as Line A, wherein control solenoid PCS4 116 is actuated to supply hydraulic fluid to clutch C4. Subsequently, the control system detects that the hydraulic circuit to clutch C4 is filled and pressurized, as detected by output of pressure switch PS4, depicted as Line B. Subsequent to fill and pressurization of hydraulic circuit for clutch C4 being detected, a command is executed to actuate clutch C4, depicted at time T2, by controlling the flow management valves, X-Valve 119 and Y-Valve 121, and actuating pressure control solenoid PCS4, as described with reference to Table 2, above. Starting at time T2, pressurized hydraulic fluid is supplied to clutch C4. At the operating conditions shown at time T2, clutch C4, depicted as Line C is not completely actuated, leading to some clutch slippage. There is a corresponding substantial increase in output torque, $T_O$, of the transmission, depicted as Line D to meet the operator torque request. At time T3, input speed, $N_I$, is essentially equal to transmission output speed multiplied by the gear ratio of the first gear, i.e. $N_O*GR1$, and clutch capacity at C4 exceeds reactive clutch torque necessary for clutch actuation, thus facilitating operation in the fixed gear GR1 by full application of clutch pressure to clutch C4.

During the period of time from T2 to T3, hydraulic clutch pressure is managed by selective actuation of PCS4 to increase output torque, $T_O$, to meet the operator torque request, $T_{O\_REQ}$, while limiting clutch slip to minimize an increase in clutch temperature that occurs as a result of friction associated with the clutch slip. Minimizing an increase in clutch temperature during the clutch slippage period is preferably limited such that the clutch temperature does not lead to degradation in clutch life. The allowable clutch thermal energy can be derived, and is now described by way of example. The clutch C4 has an allowable operating temperature range from 80 C to 250 C, and an associated thermal capacity of 20 kilojoules (kJ). Clutch temperature can be estimated based upon operating temperature of the transmission and other factors. Clutch temperature is estimated, for sake of calculation, as 150 C in this instance, which means the remaining permissible energy input to the clutch is 20 kJ* ((250 C−150 C)/(250 C−80 C)) or, about 12 kJ. A launch event from T2 to T3 typically requires an elapsed time of one half second (500 milliseconds). During the elapsed time in which the launch event occurs, clutch slippage is determined based upon input speed, $N_I$, output speed, $N_O$, and oncoming gear ratio, $N_O*GR4$. Using known relationships between power, energy, and time, it can be readily determined that energy added to the clutch C4, in the form of slippage and clutch friction, must not exceed a maximum value of 160 N-m in order to maintain physical integrity of the clutch device. The oncoming clutch torque for clutch C4, shown as line C, can be determined based thereupon. Then, oncoming clutch torque can be controlled through selective actuation of pressure control solenoid PCS4 116.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method to launch a vehicle including a powertrain comprising an internal combustion engine and first and second electrical machines and an electro-mechanical transmission selectively operative to transmit torque to a driveline, comprising:
   operating the electro-mechanical transmission in a continuously variable mode to transmit motive torque from a first electrical machine to the driveline, the first electrical machine mechanically independent and decoupled from the internal combustion engine and the internal combustion engine mechanically independent and decoupled from the driveline when a clutch is selectively released;
   selectively increasing an operating speed of the internal combustion engine independently from the driveline speed when an operator torque request exceeds a predetermined threshold, the increased operating speed of the internal combustion engine providing increased power input to the second electrical machine to generate electrical energy transmitted to the first electrical machine to facilitate increased motive torque from the first electrical machine to the driveline and pressurizing the clutch for a subsequent actuation; and
   subsequent to selectively increasing the operating speed of the internal combustion engine and pressurizing the clutch, partially actuating the clutch providing partial coupling of the second electrical machine and the internal combustion engine to the driveline to transmit motive torque generated by the second electrical machine and the internal combustion engine to the driveline through a controlled clutch torque wherein the clutch is slipping, the clutch slippage increasing the driveline speed towards the increased engine operating speed to meet the operator torque request.

2. The method of claim 1, wherein the operator torque request exceeding a predetermined threshold comprises the operator depressing an accelerator pedal to a substantially wide open throttle position.

3. The method of claim 1, wherein the operator torque request exceeding a predetermined threshold comprises the operator simultaneously depressing an accelerator pedal and a brake pedal at a vehicle speed of zero.

4. The method of claim 1, wherein selectively increasing the operating speed of the internal combustion engine comprises operating the engine at an engine speed substantially greater than an optimum engine speed based upon torque and power demands.

5. The method of claim 1, wherein permitting slippage of the controlled clutch torque wherein the clutch is slipping comprises limiting the clutch slippage based upon thermal operating characteristics of the clutch.

6. The method of claim 1, further comprising fully actuating the clutch wherein the clutch is not slipping when engine speed substantially matches an output speed of the transmission factored by a gear ratio of a fixed gear to operate the electro-mechanical transmission in a fixed gear mode.

7. Article of manufacture, comprising a storage medium having a computer program encoded therein for effecting a launch of a vehicle having a powertrain comprising an internal combustion engine and first and second electrical machines and an electro-mechanical transmission selectively operative to transmit torque to a driveline, the computer program comprising:
   code to operate the electro-mechanical transmission in a continuously variable mode to transmit motive torque from a first electrical machine to the driveline, the first electric machine mechanically independent and decoupled from the internal combustion engine and the internal combustion engine mechanically independent and decoupled from the driveline when a clutch is selectively released;
   code to selectively increase an operating speed of the internal combustion engine independently from the driveline speed when an operator torque request exceeds a predetermined threshold, the increased operation speed of the internal combustion engine pressurizing the clutch for a subsequent actuation; and
   code to partially actuate the clutch providing partial coupling of the second electrical machine and the internal combustion engine to the driveline to transmit motive torque generated by the second electrical machine and the internal combustion engine to the driveline through a controlled clutch torque wherein the clutch is slipping subsequent to selectively increasing the operating speed of the internal combustion engine, the clutch slippage increasing the driveline speed towards the increased engine operating speed to meet the operator torque request.

8. Apparatus, comprising:

an internal combustion engine and first and second electrical machines and an electro-mechanical transmission selectively operative to transmit torque therebetween and to a driveline;

the transmission comprising: an electro-hydraulic control circuit comprising a plurality of pressure monitoring devices and a plurality of selectively controllable flow control devices, and, a plurality of torque-transfer clutches; the transmission selectively operative in one of a plurality of operating modes comprising fixed gear ratio modes and two continuously variable modes; and, a control system:
- adapted to control the flow control devices of the electro-hydraulic control circuit; and,
- adapted to execute a computer program to selectively control the flow control devices of the electro-hydraulic control circuit during vehicle launch, the program comprising:
  - code to monitor an operator torque request during launch;
  - code to operate the electro-mechanical transmission in a continuously variable mode transmitting motive torque from a first electrical machine to the driveline, the first electric machine mechanically independent and decoupled from the internal combustion engine and the internal combustion engine mechanically independent and decoupled from the driveline when a clutch is selectively released;
  - code to selectively increase an operating speed of the internal combustion engine independently from the driveline speed when an operator torque request exceeds a predetermined threshold, the increased operating speed of the internal combustion engine pressurizing the clutch for a subsequent actuation;
  - code to partially actuate a clutch providing partial coupling of the second electrical machine and the internal combustion engine to the driveline to transmit motive torque generated by the second electrical machine and the internal combustion engine to the driveline through a controlled clutch torque wherein the clutch is slipping subsequent to selectively increasing the operating speed of the internal combustion engine, the increased operating speed of the internal combustion engine pressurizing the clutch for a subsequent actuation; and
  - code to fully actuate the clutch wherein the clutch is not slipping when engine speed substantially matches an output speed of the transmission factored by a gear ratio of a fixed gear to operate the electro-mechanical transmission in a fixed gear mode.

9. The apparatus of claim 8, wherein the code to partially actuate the clutch comprises code to limit the clutch slippage based upon thermal operating characteristics of the clutch.

* * * * *